U nited States Patent Office 3,613,424
Patented Oct. 19, 1971

3,613,424
METHOD AND APPARATUS FOR SHAPING BOTTLES
Norbert Normos, Courbevoie, France, assignor to Societe de Conditionnement en Aluminium (SCAL) GP, Paris, France
Filed Jan. 2, 1969, Ser. No. 788,559
Claims priority, application France, Jan. 9, 1968, 135,260
Int. Cl. B21d 22/14
U.S. Cl. 72—103                             5 Claims

ABSTRACT OF THE DISCLOSURE

Method and apparatus for profiling bottles to any form of revolution in the absence of internal formers comprising a means for mounting the bottle for rotational movement about its axis and a tool having an edge in the form of an open spiral applied against a mandrel and which is mounted for rotational movement and for displacement in the direction toward and away from the bottle for engagement with the bottle to effect the desired profiling action.

---

This invention relates to the production of bottles of different profiles without the use of internal formers and to an apparatus for carrying out the same.

In one method for continuously manufacturing tubes with non-continuous flutes or grooves, a cylinder comprising a helical bead is rolled over the tube to be fluted while moving at a uniform speed parallel to its axis. The helical bead on the cylinder or roller attacks the surface of the tube in such a way that the tangent to the bead at the point of contact is perpendicular to the axis of the tube. Although this method permits a high rate of production, the grooves are inscribed very quickly. This not only requires considerable bearing pressure but it also involves danger of deformation to the tube if it is not filled. On the other hand, if the tube is filled, the applied grooves have to be fairly deep.

It is an object of this invention to provide a method and apparatus for shaping or profiling bottles to any form of revolution, in the absence of internal formers, without danger of deformation to the bottle.

These and other objects and advantages of this invention will hereinafter appear and for purposes of illustration, but not of limitation, an embodiment of the invention is shown in the accompanying drawings in which—

In accordance with the practice of this invention, a bottle is rotated about its axis in contact with a tool having an edge in the form of an open spiral in contact with a mandrel. The method of this invention is distinguished by the fact that a tool, in the form of a blank representing the negative of the required profile in which the edge is cut, its axis being parallel to that of the bottle, is displaced progressively in the direction towards the bottle in such a way that the edge pushes the material back, its point of contact with the bottle simultaneously advancing along the generatrices thereof while its tangent is inclined relative to its axis.

The apparatus of this invention consists of a bottle support comprising a drum or barrel supporting at least one assembly in the form of a rotary chuck, a tailstock under spring pressure arranged coaxially of and cooperating with the chuck, and a means for rotating each bottle about its axis, and a profiling tool provided with an edge in the form of an open spiral having a varying depth applied against a mandrel. The apparatus is distinguished by the fact that the apex of the edge is situated on an imaginary surface of revolution representing the negative of the profile with which the bottles are to be provided, and further by the fact that the profiling tool, the axis of which is parallel to the axis of the bottles, is carried by a support mounted for sliding movement in the direction towards and away from the bottle between feed and return positions, such as by means of a cam or jack driven by a motor.

Figure 1:
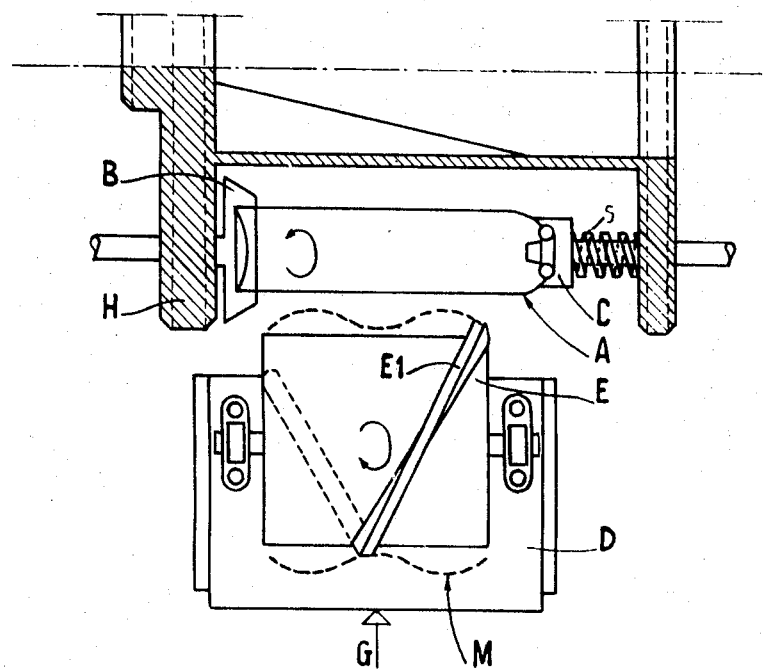
FIG. 1 is an elevational view partially in section of a device embodying the features of this invention shown at the beginnnig of an operating cycle.

Referring now to FIG. 1, the apparatus comprises a drum H which supports an assembly consisting of one or more rotary chucks B and a tailstock C under the pressure of a spring S which is arranged coaxially about and cooperates with the chuck to support a bottle A. The rotary chuck is rotated by a motor or through a reduction gear (reference M1 in FIG. 6) in such a way that the bottle rotates about its axis. The apparatus includes a profiling tool E provided with an edge E1 in the form of an open spiral applied against a mandrel. The tip of the edge E1 is situated on an imaginary surface of revolution representing the negative of the profile with which the bottles are to be provided. This edge may be cut into a blank representing the negative by removal of metal from the areas outside or beyond the edge. The profiling tool E, whose axis is parallel to the axis of the bottles A, is carried by a supporting slide D engaged by means G for displacement of the slide in the direction toward and away from the bottle between feed and return positions, as by means of a cam or jack. The tool is rotated by a motor or reduction gear L (FIG. 7) at a speed less than that at which the bottle is rotated.

FIG. 1 shows, in broken lines, the initial profile M of the blank into which the tool is cut.

The profiling operation will be described with reference to FIGS. 2-6.

Figure 2:
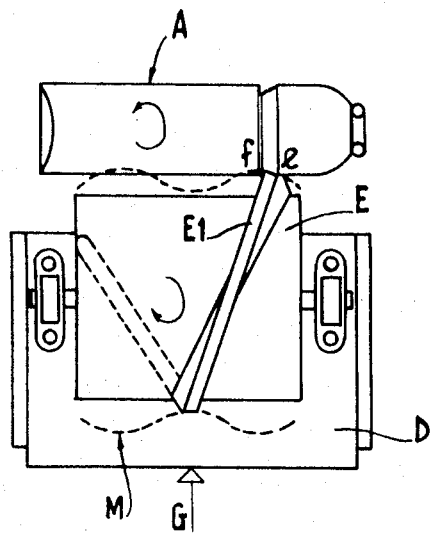
FIGS. 2-5 are elevational views of a portion of the device shown in FIG. 1, illustrating the position of parts during successive phases of the operating cycle for change of profile during one revolution of the profiling tool.
Figure 4:
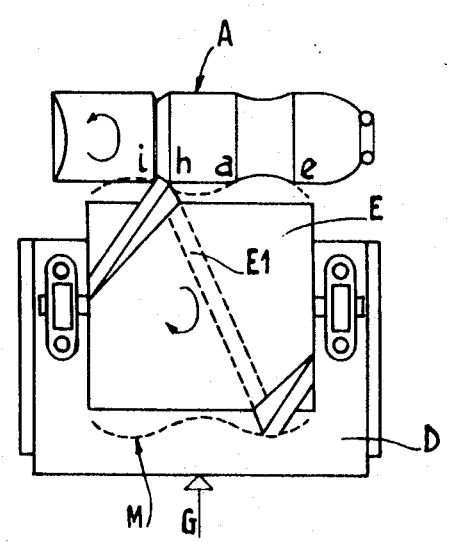
Figure 3:
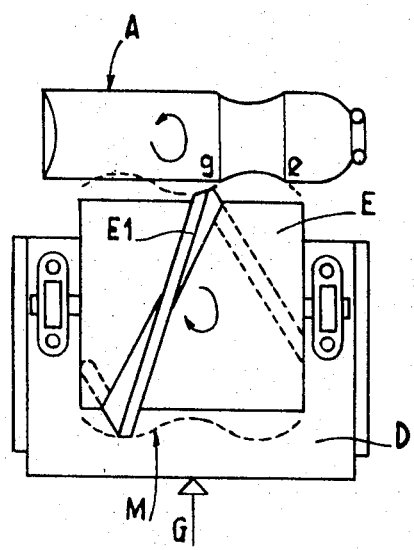
Figure 5:
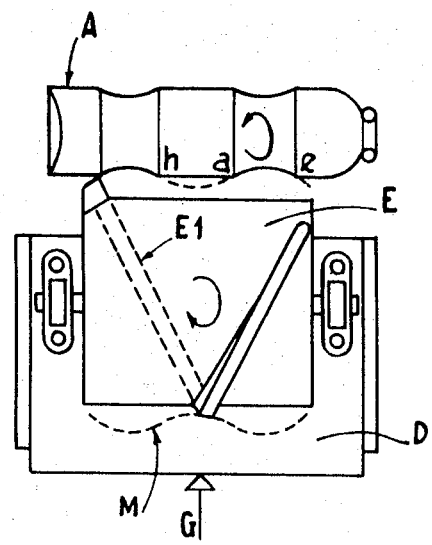

Following the approach of the profiling tool E, by advancement of the support D towards the bottle, the bottle A, which is supported in rotational movement between the chuck B and tailstock C, is touched at point e where the recess is formed at ef along a plane perpendicular to the axis (FIG. 2). The tangent to the edge at the point of contact is inclined relative to the axis. The profiling tool E is then rotated so that, under the combined effect of the rotations of the tool and of the bottle, the material is displaced (FIG. 3) towards the left of the figure, thus widening the recess ef to g. As a result of the rotation of the tool, the edge E1 again comes in contact with the bottle at point h and forms a second recess hi (FIG. 4). The edge E1 stops rotating, widening the second recess from i to j, thus inscribing upon the bottle A (FIG. 5) a first outline of the profile which it is intended to form, the negative of which is represented by the profile M of the blank into which the edge or tool E was cut.

Figure 6:
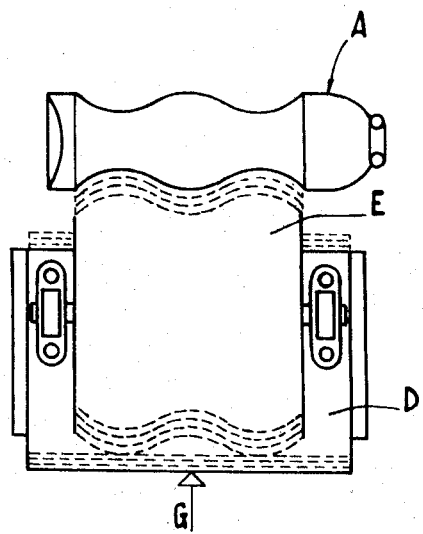
FIG. 6 is a front view showing the phases in the movement of the profiling edge toward the bottle during successive strokes.

After each revolution completed by the tool, the support D is moved further towards the axis of the bottle A, followed by the next revolution. The recesses eg and hj are thus successively deepened with each revolution until the required ultimate profile is obtained (FIG. 6).

The deepening of the recesses is progressive and takes place at the same time as displacement of the metal which enables the wall thickness of the bottle A to be maintained and insures a form of revolution through cold hardening of these walls.

Figure 7:
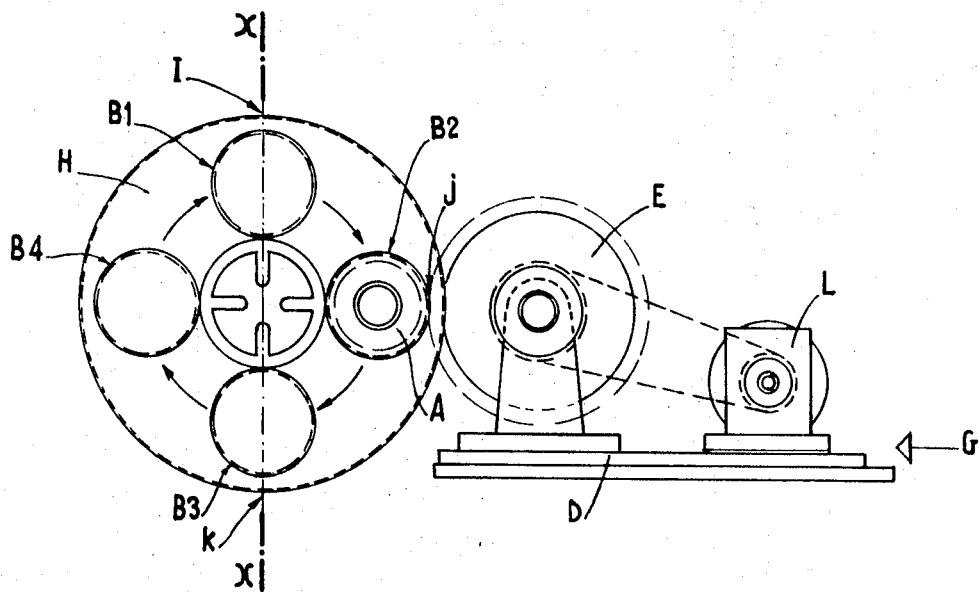
FIG. 7 is a view taken along the line y—y of FIG. 8 showing one embodiment of the apparatus of this invention.
Figure 8:
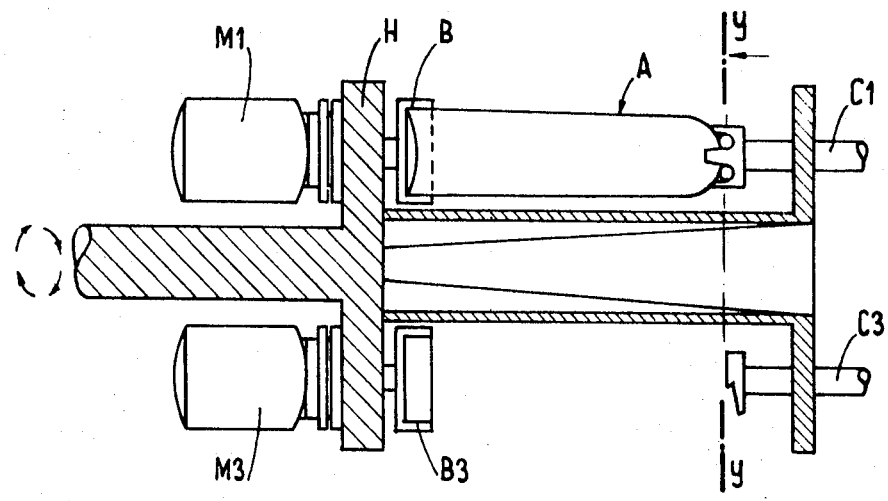
FIG. 8 is a sectional view taken along the line x—x of FIG. 7.

In the embodiment of the apparatus shown in FIGS. 7 and 8, the drum H supports several chucks B1 to B4 arranged equidistantly about a common circumference. Accordingly, a bottle profiled and terminated may be replaced by a new bottle to be profiled at I on the chuck B1 while the tool E is acting at J on the bottle A which, driven by the chuck B, is rotating. By turning the drum H a quarter of a revolution in the direction indicated by the arrows in FIG. 7, the chuck B2 moves to position K while the chuck B1 moves to position J so that the bottle which has just been inserted is profiled in its turn. Each of the chucks B1 to B4 may be driven either by an individual means, such as motors M1 to M4, although only M1 to M3 are visible, or by a single motor, in which event the movement is then transmitted to the chucks B1 to B4 through any disconnectible driving means such as belts, pinions, friction clutches, and the like. The tool E is driven by a reduction motor L mounted on the support D, preferably a variable speed motor, so as to equalize the reactive torque. This motor may advantageously be of the constant-torque type.

The advance of the support D by means G, such as a cam or jack, is synchronized with the displacement of the drum H between the positions I, J and K. The support D moves back and forth while the drum remains stationary.

It will be apparent from the foregoing that I have provided a simple and efficient means to effect the shaping or profiling of bottles.

It will be understood that changes may be made in the details of construction, arrangement and operation without departing from the spirit of the invention, especially as defined in the following claims.

I claim:

1. A method of profiling bottles in the absence of internal formers without deformation of the bottle comprising the steps of rotating a bottle about its axis, supporting a profiling tool in contact with the bottle with the tool having an edge in the form of an open longitudinal spiral having a varying depth over the length of the spiral to define a profile which is the negative of the desired profile of the bottle, the axis of the bottle being parallel to the axis of the spiral, and displacing the tool toward the bottle whereby the edge of the spiral displaces the material forming the bottle along the point of contact of the edge with the bottle.

2. An apparatus for profiling bottles comprising a bottle support in the form of a drum adapted to support at least one assembly in the form of a rotary chuck, a tailstock under spring pressure arranged coaxially with the chuck and a means for rotating each bottle about its axis, a profiling tool having an edge in the form of an open longitudinal spiral of varying depth formed on a mandrel, the tip of the edge being situated on an imaginary surface of revolution representing the negative of the profile with which the bottles are to be provided, the profiling tool having an axis parallel to the axis of the bottles, a slide supporting the tool for movement in the direction toward and away from the bottle support between feed and return positions, and means for displacing the slide between feed and return positions.

3. An apparatus as claimed in claim 2 in which the means for rotating the tool comprises a reduction motor of variable speed and substantial constant torque.

4. An apparatus as claimed in claim 2 in which a number of chuck and tailstock units are supported in circumferentially spaced apart relation on the drum and which includes means for incremental rotation of the drum about its axis.

5. An apparatus as claimed in claim 2 in which the means for displacing the slide between feed and return positions includes means synchronized out of time with the advance of the drum.

References Cited

UNITED STATES PATENTS

| | | | |
|---|---|---|---|
| 934,335 | 9/1909 | Nahm et al. | 72—103 |
| 1,792,812 | 2/1931 | Cameron | 72—103 |
| 2,045,602 | 6/1936 | Huntsman | 72—103 |
| 2,424,581 | 7/1947 | Peters | 113—120 M |
| 2,576,240 | 11/1951 | Rothe | 113—120 M |

RICHARD J. HERBST, Primary Examiner

U.S. Cl. X.R.

113—120